March 17, 1970  J. T. ARNOLD  3,501,631
CHARGED PARTICLE TRAPPING MEANS EMPLOYING A VOLTAGE
DIVIDER AND A PLURALITY OF SIMPLE CONDUCTORS
TO PRODUCE COMPLEX TRAPPING FIELDS
Filed Oct. 21, 1968  4 Sheets-Sheet 1

INVENTOR.
JAMES T. ARNOLD
BY
ATTORNEY

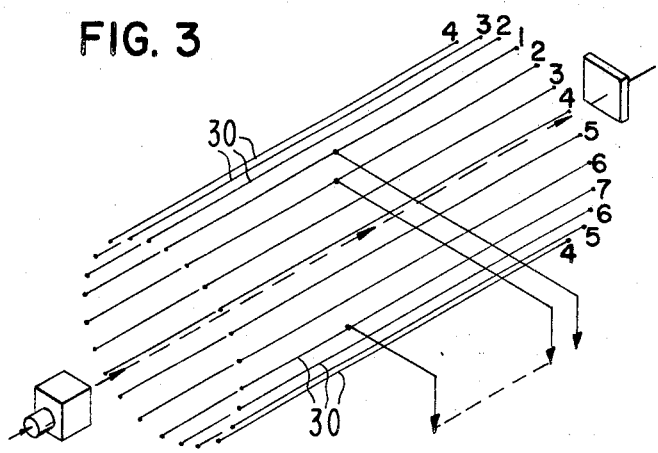
FIG. 3
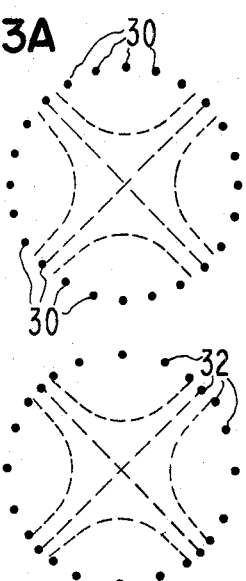
FIG. 3A
FIG. 3B
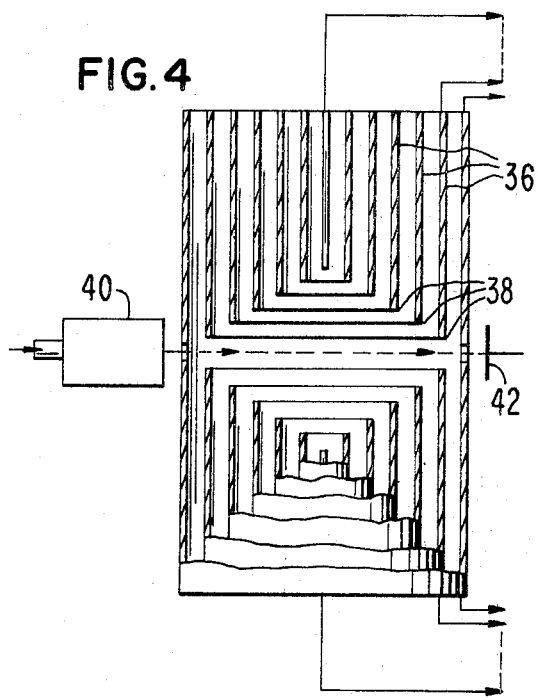
FIG. 4
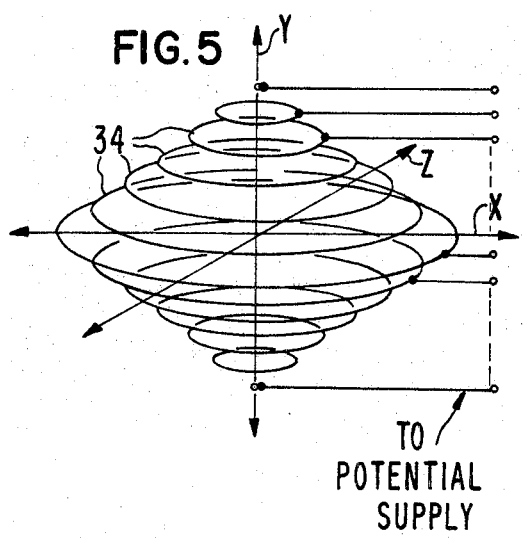
FIG. 5
TO POTENTIAL SUPPLY
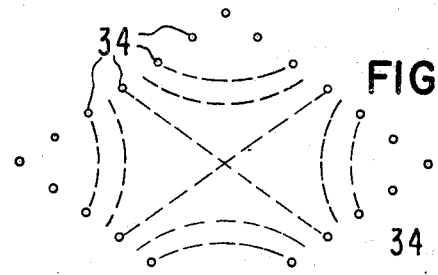
FIG. 5A
INVENTOR.
JAMES T. ARNOLD
BY
ATTORNEY March 17, 1970 J. T. ARNOLD 3,501,631
CHARGED PARTICLE TRAPPING MEANS EMPLOYING A VOLTAGE
DIVIDER AND A PLURALITY OF SIMPLE CONDUCTORS
TO PRODUCE COMPLEX TRAPPING FIELDS
Filed Oct. 21, 1968 4 Sheets-Sheet 3

INVENTOR.
JAMES T. ARNOLD
BY
ATTORNEY.

March 17, 1970

J. T. ARNOLD 3,501,631

CHARGED PARTICLE TRAPPING MEANS EMPLOYING A VOLTAGE
DIVIDER AND A PLURALITY OF SIMPLE CONDUCTORS
TO PRODUCE COMPLEX TRAPPING FIELDS

Filed Oct. 21, 1968

INVENTOR.
JAMES T. ARNOLD
BY
ATTORNEY

United States Patent Office 3,501,631
Patented Mar. 17, 1970

3,501,631
CHARGED PARTICLE TRAPPING MEANS EMPLOYING A VOLTAGE DIVIDER AND A PLURALITY OF SIMPLE CONDUCTORS TO PRODUCE COMPLEX TRAPPING FIELDS
James T. Arnold, Los Gatos, Calif., assignor to Varian Associates, Palo Alto, Calif., a corporation of California
Filed Oct. 21, 1968, Ser. No. 769,024
Int. Cl. H01j 39/36
U.S. Cl. 250—41.9
14 Claims

ABSTRACT OF THE DISCLOSURE

Charged particle trapping structures for use in mass spectrometers and the like wherein the ideal potential distribution forming the trapping means is generated using simple geometrical structures in place of the highly precise electrode surfaces previously used for the same purpose. An array of electrodes is arranged and energized in a predetermined manner so as to produce the desired trapping fields.

DISCUSSION OF THE PRIOR ART

Various means employing electric and magnetic fields have been used as traps for charged particles. Those using only electric fields cannot function as traps using electrostatic fields alone, since potentials in charge free regions have their extrema at their boundaries where potentials are defined by conducting electrodes. With electric fields alone, it is possible to generate average effective potential wells for the purpose of trapping charged particles with the proper circumstance of direct and alternating fields. One example of such a trap has been described by W. Paul et al. in U.S. Patent 2,939,952 of June 7, 1960. FIGURE 12 of this patent shows a cross section of Paul's device in which the electric potential is defined at boundaries consisting of conducting electrodes shaped to conform to surfaces which can be defined by the equations (1) $$\frac{x^2+y^2-2z^2}{r_o^2}=1$$

and (2) $$\frac{x^2+y^2-2z^2}{r_o^2}=1$$

These surfaces conform to a set of solutions of the Laplace equation, $\nabla^2\phi=0$. If the electrodes are connected to an electric generator, the potential within the electrode structure will conform to one described by:

(3) $$\phi=\phi_o\frac{x^2+y^2-2z^2}{r_o^2}$$

In order to afford a trap or effective average potential well for charged particles of a desired charge-to-mass ratio, the electric generator must provide that $\phi=U+V\cos\omega t$ where U, V, $\omega$, $r_o$ and the charge-to-mass ratio are related in a particular way. Paul and others have shown the conditions under which stable bounded motions (therefore, trapped) can occur for particles of a desired charge-to-mass ratio.

One application of two dimensional traps of this description is the conventional quadrupole mass spectrometer described by Paul and others. In this application, the instability and unbounded motion of charged particles having other than the desired charge-to-mass ratio is used to reject these particles from the direction of transmission through the structure, thereby selecting the particles of desired charge-to-mass ratio for transmission. The instability and unbounded motion in the case of the two dimensional trap takes place in directions transverse to the direction of transmission.

In another application, specifically the one cited above with reference to FIGURE 12 of Paul's patent, the trap is three dimensional, and particles may be retained and confined in all three directions, rather than transmitted as in the case of the conventional quadrupole mass spectrometer.

For devices intended for high resolution of charge-to-mass ratio, whether they be two dimensional or three dimensional traps, the dynamics of motion require that the fields deviate from the ideal fields, defined by the equation above, for example, by as little as possible at all points within the trap. In the familiar two dimensional trap, used in one application as a quadrupole mass spectrometer, the ideal geometry for the electrodes is comprised of four parallel rods whose boundaries in transverse section conform precisely to the sheets of equilateral hyperbolae. The required precision is difficult to achieve with conventional means to form the rods. In order to facilitate manufacture, the desired surfaces are approximated by the use of rods of circular cross section whose radius of curvature approximates that of the vertices of the desired equilateral hyperbolae.

This geometry of electrodes will support fields of approximately the correct conformation near the central axis of the trap. While this arrangement will, in fact, function as a two dimensional trap for charged particles of desired charge-to-mass ratio, its operation is restrained by the fact that the characteristics of the trap favor the trapping of particles of slightly differing charge-to-mass ratio in different parts of the structure. This fact vitiates the purpose of traps having high resolving power. Brubaker (Vacuum Technology conference, 1967), has demonstrated in an improved quadrupole mass spectrometer, having electrode rods of truly hyperbolic section, the efficacy of this preferred geometry.

DISCUSSION OF THE PRESENT INVENTION

The principal object of the present invention is therefore to provide the precise trapping field geometry required for devices of high charge-to-mass resolution without requiring the generation of highly precise physical surfaces having the desired geometrical form.

It is well known that if a region to be bounded by surfaces of electrically conducting materials, which surfaces coincide with solutions of the Laplace equation:

(4) $$\frac{d^2\phi}{dx^2}+\frac{d^2\phi}{dy^2}+\frac{d^2\phi}{dz^2}=0$$

and if these surfaces be excited by an external generator or battery to have potentials $\phi$ which conform with values of $\phi$ corresponding to the set of solutions of 4 coinciding with these surfaces, then the potentials within the region will conform to members of the same set of solutions of 4.

As an example, cited above, the case of the two dimensional quadrupole trap illustrates this principle. The hyperbolic surfaces of:

(5) $$x^2-y^2=r_o^2$$

and (6) $$x^2-y^2=-r_o^2$$

bound the region of interest and if these surfaces are excited to potentials of $+\phi_o$ and $-\phi_o$, respectively, the potential within the area bounded will conform to:

(7) $$\phi=\phi_o\frac{x^2-y^2}{r_o^2}$$

Conventional traps are constructed with boundaries constituting equipotential surfaces as in 5 and 6 or their three dimensional analogs.

The basis of this invention lies in the distribution of a number of conductors over surfaces which do not conform to the surfaces representing desired solutions of the Laplace equation. These surfaces and therefore the fabrication and placement of the conductors may be more convenient from the standpoint of geometrical control than surfaces (such as hyperboloidal surfaces, for example) used in the prior art which are necessarily difficult to fabricate to the required precision.

Whereas the desired potential distribution can be achieved by the disposition of conducting equipotential surfaces in accordance with the desired solutions of the Laplace equation as described above, this invention employs a structure having elements conforming to a convenient, but otherwise arbitrary set of surfaces on which is disposed a particular point distribution of potentials supplied by an external generator system.

The generation of a two dimensional quadrupole potential comprises a useful illustration of the invention.

Let the boundary of the region of interest be that of a square prism defined by the four surfaces:

(8) $x = y + a$
(9) $x = y - a$
(10) $x = -y + a$
(11) $x = -y - a$

If these surfaces be made from an electrically resistive material of uniform resistivity and if they be joined electrically at their intersections and on those lines to conducting wires, and if the wires at $x = \pm a$ be connected to a potential source $+\phi_0$ and those at $y = \pm a$ to a source at $-\phi_0$, then the potential distributions from $[x=a, y=0]$ to $[x=0, y=a]$ and on the other three sides similarly described will be linear. This distribution of potential coincides wiht the distribution of potential of the quadrupole field described by:

(12) $$\phi = \phi_0 \frac{x^2 - y^2}{r_0^2}$$

along the sides of the square defined by (8), (9), (10), (11) when $a = r_0$. This linear distribution of potential on the surfaces of the prism was so chosen from the discovery of the potential distribution of the quadrupole field on the surfaces defined by Equations 8, 9, 10, and 11 by simultaneous solution of these equations with (12) in which $r_0$ is set equal to $a$, giving respectively:

(13) $$\phi = \phi_0 \frac{2ay + a^2}{a^2}$$

(14) $$\phi = \phi_0 \frac{-2ay + a^2}{a^2}$$

(15) $$\phi = \phi_0 \frac{-2ay + a^2}{a^2}$$

(16) $$\phi = \phi_0 \frac{2ay + a^2}{a^2}$$

which clearly represent the linear distribution of potential required and also represented by the arrangement and excitation of the four resistive surfaces.

The simultaneous solution of (12) with the equation of the surface of a right circular cylinder,

(17) $x^2 + y^2 = a^2$ leads to

(18) $$\phi = \phi_0 \frac{-2y^2 + a^2}{a^2}$$

and since for this surface $y = a \sin \theta$ where $\theta$ is the angle along the arcs of (17) to the points $y$ in (18) from the points $y=0$ on (17), Equation 18 becomes $\phi = \phi_0 (-2 \sin^2 \theta + 1)$ or

(19) $\phi = +\phi_0 \cos 2\theta$

Thus, if a surface distribution of potential conforming to 19 on the boundary of a right circular cylinder of radius $a = r_0$ can be achieved, the desired hyperbolic potential will appear inside this boundary.

IN THE DRAWING

FIGS. 3, 3A and 3B illustrate a charged particle trapping structure in accordance with the present invention and having a circular cross-section.

FIGS. 4, 5 and 5A illustrate a charged particle trap in accordance with the invention for providing three-dimensional stability of charged particle motion.

DETAILED DESCRIPTION OF THE PREFERRED EMBODIMENTS

In the FIGURES 1 through 7 are illustrated several embodiments of the invention generally described above. The illustrations have been detailed in some cases to include a charged particle source and collector, representing one practical application of the traps which can be adapted, for example, as in the case of FIG. 1, to function as a mass filter.

Figure 1:
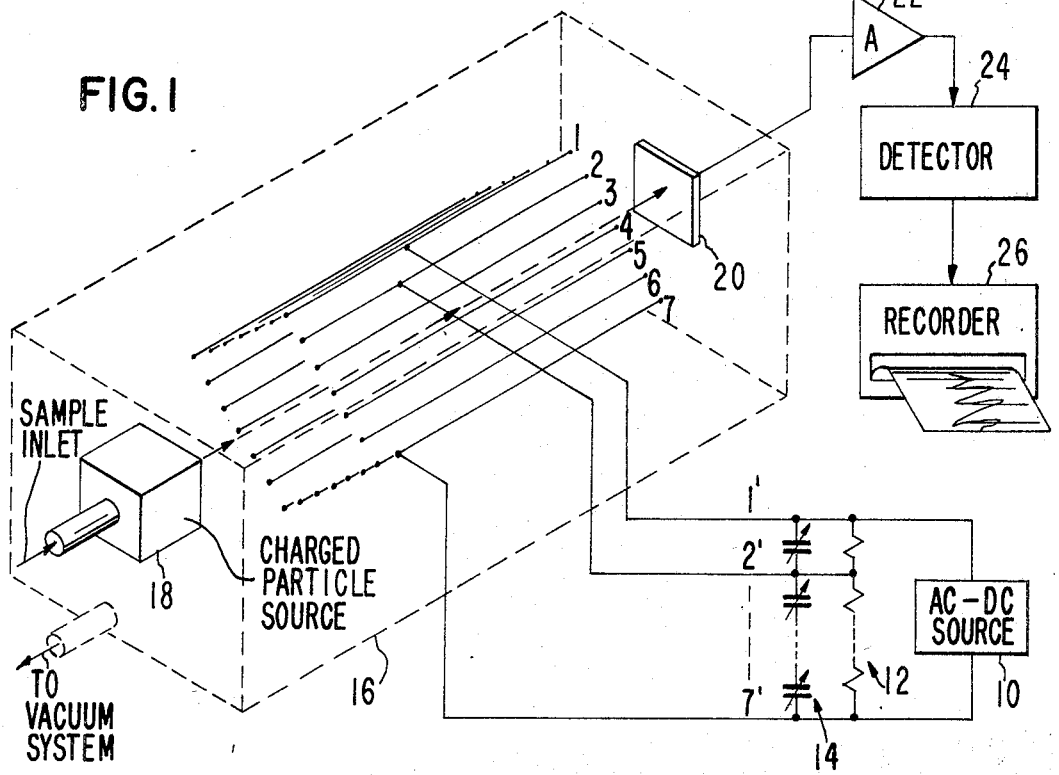
FIGS. 1 and 2 illustrate a charged particle trapping structure in accordance with the present invention having a parallelogramic or square cross-section.
Figure 2:
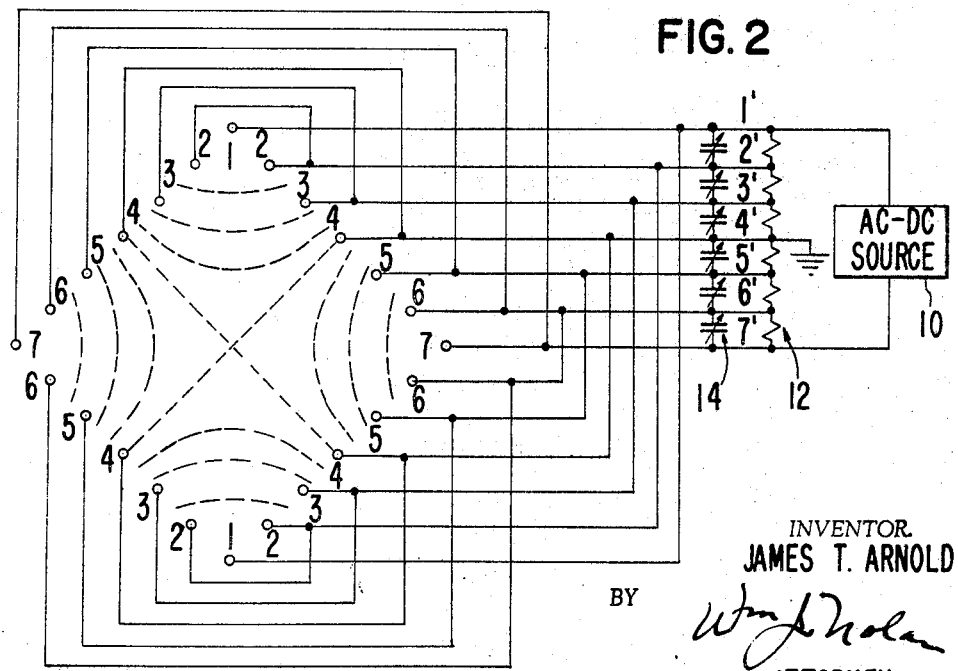

Referring now to FIG. 1, there is disposed a plurality of taut parallel conducting wires 1, 2, 3 . . . 7 arranged so that their intersections with a transverse plane lie on a square in that plane as shown in FIG. 2. For clarity only one of the sides of the array is numbered in FIG. 1. An AC and DC source 10 is connected to each of the wires through a linear voltage divider 12 by means of separate leads, designated 1', 2', 3' . . . 7' for clarity, to the various taut conducting wires 1, 2, 3 . . . 7. By suitable adjustment of the potentiometer 12 the respective wires 1–7 are caused to be excited to potentials corresponding to the potentials of a quadrupole field at their respective locations in the transverse plane. The fields in the immediate vicinity of the wires are influenced slightly by the region outside the structure. However, at a distance inside the array approximately equal to the wire spacing, this perturbation will largely disappear. It may also be mitigated by the use of more wires and wires of appropriate cross section, including square or rectangular wires.

The adjustable capacitors 14 shown in the voltage dividers of FIGS. 1 and 2 are provided to ensure the proportionate division of the AC as well as the DC potentials, there being some possibility of stray capacitance which would disturb such proportionality. Moreover, the resistors in the divider 12 may be adjustable, thereby affording a means to compensate for slight geometrical errors in the placement of the wires.

A connection diagram is illustrated in FIG. 2 showing how each of the wires 1–7 of FIG. 1 may be connected to the AC–DC source 10. The hyperbolic field distribution created as a result of the potentials established in the wires 1–7 is also illustrated in the space enclosed by the array.

In order to illustrate one of the modes of utility of the trapping structure previously described the array of FIG. 1 is shown enclosed in an exhaustible envelope 16 and a charged particle source 18 is shown directing particles, along the longitudinal axis of the array toward a collector 20. It will thus be apparent that those charged particles to which the fields within the array offer stability of transit will continue through the trap to be collected on collector 20 while the remaining charged particles will be rejected and will not continue through the trap to reach collector 20.

The collector 20 is schematically shown as being connected to an amplifier 22 and detector 24 which detects the number of particles which reach the collector 20. The output of the detector 24 is fed to a suitable recorder 26 for providing a graphic record of the detector output.

Turning further to FIG. 3, there is illustrated a set of taut parallel wires 30 so disposed that their intersections with a transverse plane lie on a circle in that plane. In FIG. 3A, one of these sets of intersections is illustrated where the wires are positioned with equal angles each to the next. The excitation of these wires 30 must be from a divider such as shown in FIGS. 1 and 2 which furnishes potentials corresponding to equal increments of angle in Equation 19 above. In FIG. 3B, an alternative arrangement is illustrated to accommodate a uniform voltage divider by a non-uniform distribution of angular increments between the wires 32. In this case, rewriting Equation 19, $$(20) \qquad \theta_n = \text{arc cos} \frac{\phi_n}{\phi_0}$$

with $\theta_n$ the angle of the $n$th wire and $\phi_n$ representing the $n$th equal increment of potential from the uniform divider.

The potentials described above and furnished by the example are such as to produce the desired two-dimensional trapping fields with the presumption that the structure is long in the direction of the axis of symmetry.

Three-dimentional traps may also be constructed according to the method of this invention. Such a three-dimensional trap is shown in FIG. 5; therein a set of circular conducting rings 34 are drawn to be contiguous to a pair of facing right circular cones described by the equations:

$$(21) \qquad \sqrt{x^2+z^2} = (r_0 + \sqrt{2}y)$$

and $$(22) \qquad \sqrt{x^2+z^2} = (r_0 - \sqrt{2}y)$$

When these circular conducting rings 34 are uniformly spaced and are excited by an AC and DC source via a linear potential divider as was employed in the example of FIG. 1, the potenial within the structure will be described by:

$$(23) \qquad \phi = [U + V \cos \omega t]\frac{x^2 + z^2 - 2y^2}{r_0^2}$$

The equipotentials of this expression are hyperboloids of revolution which will, in fact, provide trapping, given the correct values of $U/V$, U, V and $\omega$ for charged particles of the correct charge-to-mass ratio.

FIG. 4 shows one possible method of distributing conductors to give the required potential distribution within the structure. The electrodes 36 shown in broken section are right circular cylinders whose truncated boundaries 38 are their intersections with the right circular cones of Equations 21 and 22 above. This embodiment is also shown with a charged particle source 40 and collector 42. In FIG. 5A the equipotential fields generated by such a structure are depicted in what might be a section taken in either the $x-y$ or $z-y$ planes since the structure and resulting equipotentials are symmetrical about the $y$-axis.

Figure 6:
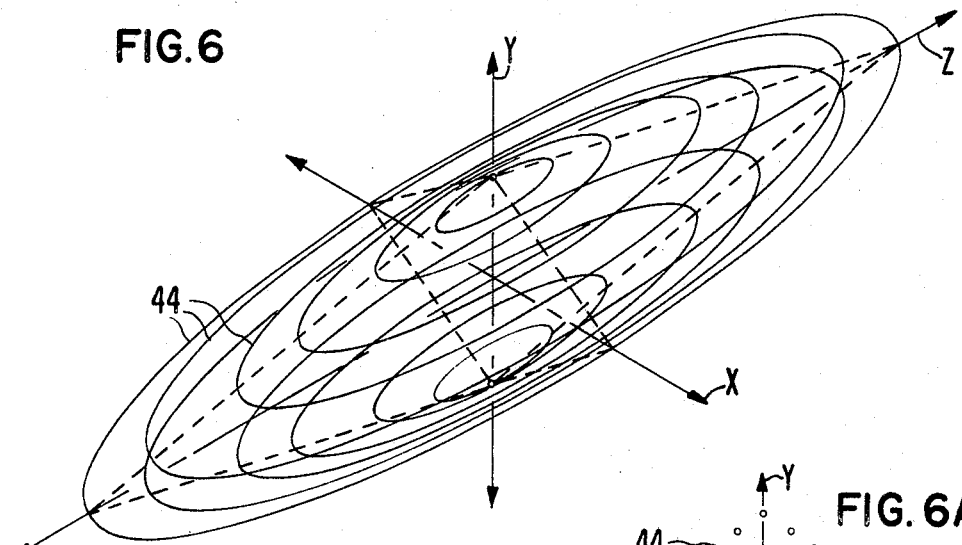
FIGS. 6, 6A, 6B, 6C and 7 illustrate another embodiment of a charged particle trap in accordance with the present invention for providing three-dimensional stability of motion.

Similarly, FIG. 6 shows an additional configuration, consisting in this case of a set of elliptical rings 44 so disposed as to be contiguous to the surface of the two right elliptical cones defined by:

$$(24) \qquad z^2 + k^2x^2 = (r_0 + y\sqrt{k^2+1})^2$$

and $$(25) \qquad z^2 + k^2x^2 = (r_0 - y\sqrt{k^2+1})^2$$

Figure 6A:
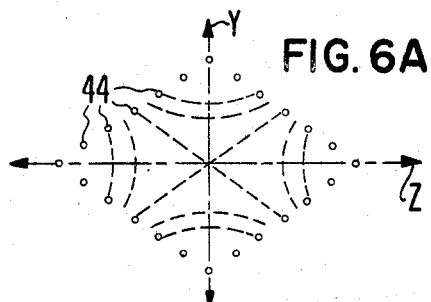
Figure 6B:
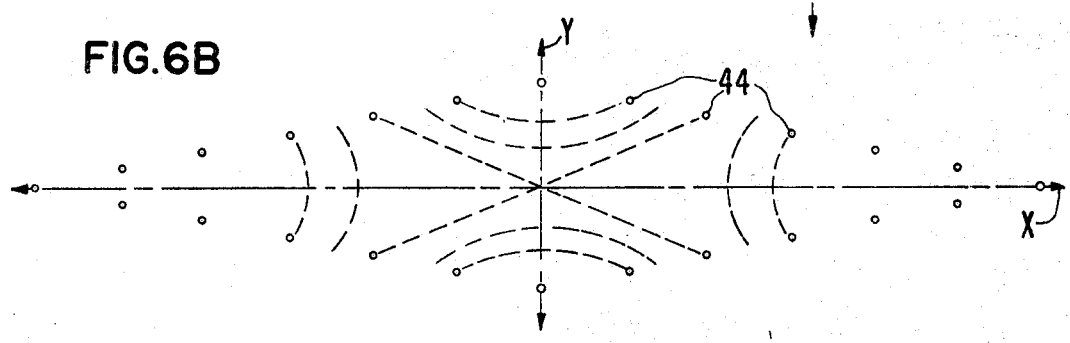
Figure 6C:
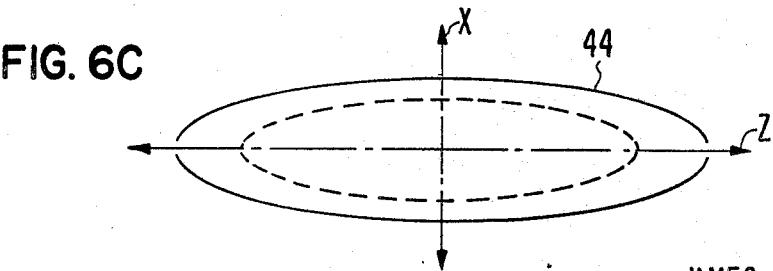

If these rings be uniformly spaced and excited by an appropriate AC–DC source provided with a uniform voltage divider as was shown with FIG. 1, then the potentials generated within the interior of the structure will be hyperboloidal. They are illustrated in their $y-z$, $x-y$, and $z-x$ sections, respectively, in FIGS. 6A, 6B, and 6C. The fields resulting from these potentials will trap charged particles of selected charge-to-mass ratio as is the case in the example of FIG. 5 described above.

It should be specifically mentioned that the configurations of FIGS. 5 and 6 when appropriately excited constitute three-dimensional traps which can contain the motion of selected charged particles in all possible directions.

Figure 7:
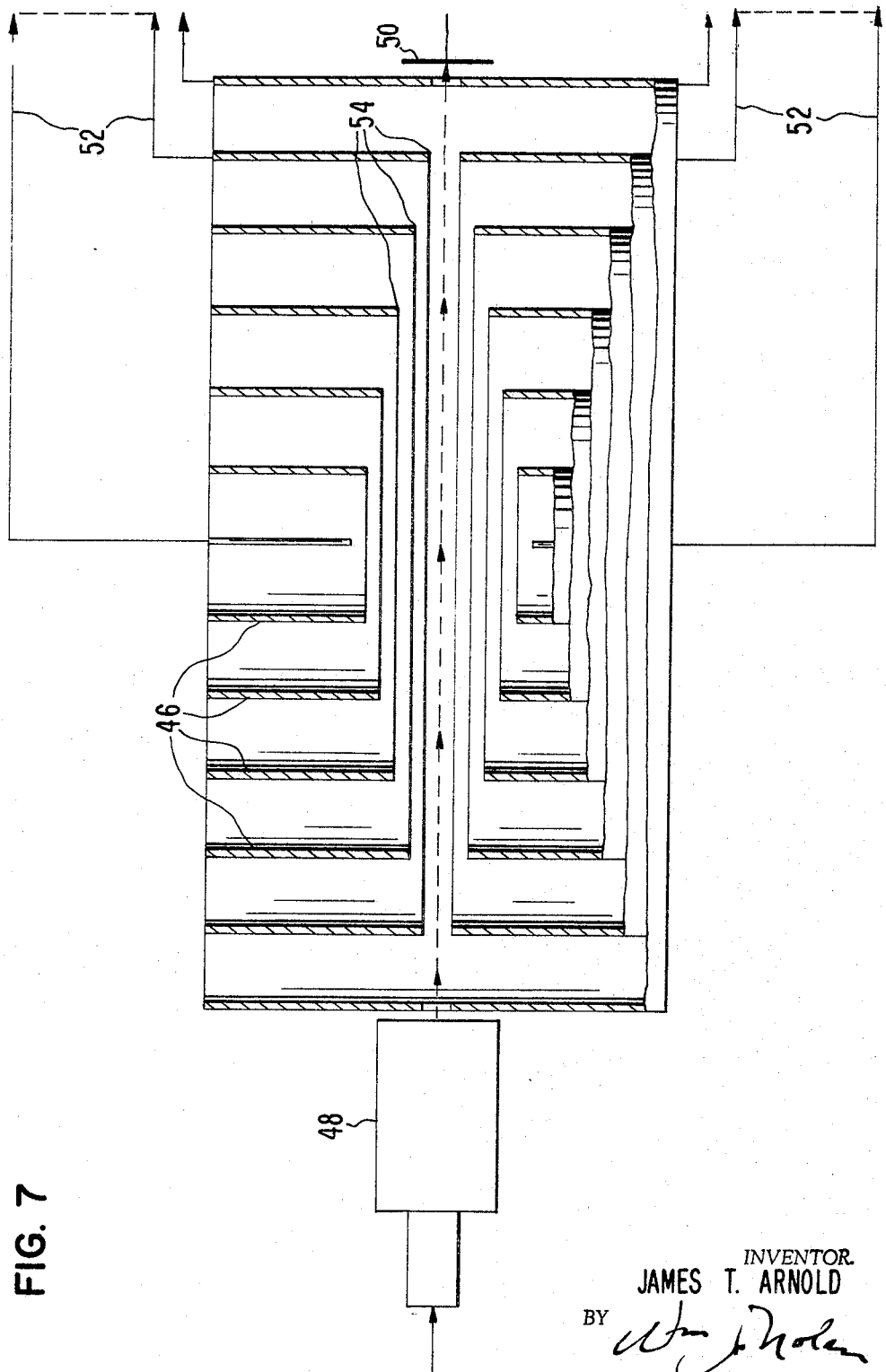

FIG. 7, analogous to FIG. 4, represents a structure by which the potentials of the example of FIG. 6 may be achieved. The electrodes 46 shown in broken section in FIG. 7 are for this example right elliptical cylinders whose truncated boundaries intersect at equal intervals the right elliptical cones described by Equations 24 and 25. This embodiment is also shown with a charged particle source 48 and collector 50. A set of conducting leads 52 are also shown for connecting the electrodes 46 to a suitable source of potentials, as illustrated in FIGS. 1 and 2, for example.

It will, of course, be apparent that the bounding edges 54 of the elliptical cylinders 46 will act to create field distributions within the trapping field region in substantially the same manner that an actual set of ring electrodes would. The suggested choice of conductive cylinders is obviously made for reasons of physical rigidity and support. It should be quite clear, however, that many other means of support may be chosen.

After having read the above disclosure it will become apparent that many alterations and modifications may be made to the disclosed apparatus without departing from the invention. It is therefore to be understood that this description is for purposes of illustration only and is in no manner intended to be limited in any way. I intend that the appended claims be interpreted as covering all modifications which fall within the true spirit and scope of my invention.

I claim:

1. Charged particle trapping means for establishing a potential distribution about an axis such that charged particles within a given range of mass-to-charge ratios will have stable motion within said potential distribution and particles having mass-to-charge ratios outside said given range will experience instability in said potential distribution and will be rejected, said trapping means comprising:

an array of conducting elements substantially symmetrically disposed about said axis and including at least two conducting portions in each quadrant spaced from said axis, potential supply means for providing an electrical potential having both AC and DC components, potential distribution means coupling said supply means to the respective conducting elements for establishing on the different ones of said conducting elements selected different potentials such that the distribution of said selected different potentials in each quadrant around said axis is the mirror image of the distribution in the adjacent quadrant.

2. Charged particle trapping means as recited in claim 1 wherein said conducting elements are long straight conductors disposed parallel to said axis and spaced around said axis such that the distance separating adjacent conductors is small as compared with a transverse dimension between conductors lying in a plane including said axis.

3. Charged particle trapping means as recited in claim 2 wherein the locus of the intersections of said conductors with a plane transverse to said axis describes a parallelogram.

4. Charged particle trapping means as recited in claim 2 wherein the locus of the intersections of said conductors with a plane transverse to said axis describes a circle.

5. Charged particle trapping means as recited in claim 2 wherein the spacing between adjacent ones of said conductors is uniform and the potential distribution among said conductors varies in a positionally predetermined manner.

6. Charged particle trapping means as recited in claim 1 wherein said conducting elements are comprised of two sets of circular conductors of decreasing radii which are disposed along the surfaces of a pair of imaginary right circular cones sharing a common base, the like conductors of each set being similarly energized with a predetermined potential distribution so as to provide a potential field distribution within the array offering a three dimensionally stable region for charged particles of a certain mass-to-charge ratio.

7. Charged particle trapping means as recited in claim 1 wherein said conducting elements are comprised of two sets of elliptical conductors of decreasing radii which are disposed along the surfaces of a pair of imaginary right elliptical cones sharing a common base, the like conductors of each set being similarly energized with a perdetermined AC and DC potential distribution so as to create within said array an hyperboloidal potential field distribution offering a three dimensionally stable region for charged particles of a certain mass-to-charge ratio.

8. Charged particle mass filter means for the establishment of a potential distribution about an axis such that charged particles within a given range of mass-to-charge ratios caused to enter said potential distribution will have stable motion through said potential distribution and will exit therefrom substantially along said axis, and particles having mass-to-charge ratios outside said given range will experience instability and will be rejected from motion along said axis, said mass filter means comprising:
   an array of conducting elements substantially symmetrically disposed about said axis and including at least two conducting portions in each quadrant spaced from said axis,
   potential supply means for providing an electrical potential having both AC and DC components, potential distribution means coupling said supply means to the respective conducting elements for establishing on the different ones of said conducting elements selected different potentials such that the distribution of said selected different potentials in each quadrant around said axis is the mirror image of the distribution in the adjacent quadrant.

9. Charged particle mass filter means as recited in claim 8 wherein said conducting elements are long straight conductors disposed parallel to said axis and spaced around said axis such that the distance separating adjacent conductors is small as compared with a trnsverse dimension between conductors lying in a plane including said axis.

10. Charged particle mass filter means as recited in claim 9 wherein the locus of the intersections of said conductors with a plane transverse to said axis describes a parallelogram.

11. Charged particle mass filter means as recited in claim 9 wherein the locus of the intersections of said conductors with a plane transverse to said axis describes a circle.

12. Charged particle mass filter means as recited in claim 9 wherein the spacing between adjacent ones of said conductors is uniform and the potential distribution among said conductors varies in a positionally predetermined manner.

13. Charged particle mass filter means as recited in claim 8 wherein said conducting elements are comprised of two sets of circular conductors of decreasing radii which are disposed along the surfaces of a pair of imaginary right circular cones sharing a common base, the like conductors of each set being similarly energized with a predetermined potential distribution so as to provide a potential field distribution within the array offering a three dimensionally stable region for charged particles of a certain mass-to-charge ratio.

14. Charged particle mass filter means as recited in claim 8 wherein said conducting elements are comprised of two sets of elliptical conductors of decreasing radii which are disposed along the surfaces of a pair of imaginary right elliptical cones sharing a common base, the like conductors of each set being similarly energized with a predetermined AC and DC potential distribution so as to create within said array an hyperboloidal potential field distribution offering a three dimensionally stable region for charged particles of a certain mass-to-charge ratio.

References Cited

UNITED STATES PATENTS

| | | | |
|---|---|---|---|
| 2,939,952 | 6/1960 | Paul et al. | 250—41.9 |
| 3,280,326 | 10/1966 | Gunther | 250—41.9 |

RALPH G. NILSON, Primary Examiner

C. E. CHURCH, Assistant Examiner